United States Patent [19]

Taylor et al.

[11] Patent Number: 6,019,455
[45] Date of Patent: Feb. 1, 2000

[54] METHOD OF AND APPARATUS FOR TRANSFERRING MATERIAL FROM A BULK MEDIUM

[75] Inventors: Peter John Taylor; Neil Emerton; Richard Wilhelm Janse Van Rensburg, all of Cambridge, United Kingdom

[73] Assignee: Tonejet Corporation Pty. Ltd., Eastwood, Saudi Arabia

[21] Appl. No.: 08/737,979

[22] PCT Filed: May 26, 1995

[86] PCT No.: PCT/GB95/01215

§ 371 Date: Nov. 22, 1996

§ 102(e) Date: Nov. 22, 1996

[87] PCT Pub. No.: WO95/32864

PCT Pub. Date: Dec. 7, 1995

[30] Foreign Application Priority Data

May 26, 1994 [GB] United Kingdom .................... 9410558

[51] Int. Cl.[7] ........................................ B41J 2/04
[52] U.S. Cl. .................. 347/54; 347/55; 399/241
[58] Field of Search .............. 347/55, 112, 141, 347/151, 54; 239/3, 690; 399/241, 244, 242, 261

[56] References Cited

U.S. PATENT DOCUMENTS

| | | | |
|---|---|---|---|
| 4,717,926 | 1/1988 | Hotomi | 347/55 |
| 4,928,125 | 5/1990 | Iino | 347/55 |
| 5,053,824 | 10/1991 | Schram | 399/266 |
| 5,144,340 | 9/1992 | Hotomi et al. | 347/55 |
| 5,172,170 | 12/1992 | Hays et al. | 399/266 |
| 5,339,142 | 8/1994 | Hays | 399/266 X |

FOREIGN PATENT DOCUMENTS

| | | |
|---|---|---|
| 2-593434 | 1/1987 | Japan . |
| 62-5282 | 1/1987 | Japan . |
| 2-672806 | 10/1996 | Japan . |
| 8-272219 | 10/1996 | Japan . |

*Primary Examiner*—John Barlow
*Assistant Examiner*—C. Dickens
*Attorney, Agent, or Firm*—Watson Cole Grindle Watson P.L.L.C.

[57] ABSTRACT

A method of depositing material on a surface (136) is described in which a bulk medium (for example ink 122) in the form of a composition of dispersed insoluble material (for example ink particles) and a support medium is supplied to a cell (120). A movement of the insoluble material within the bulk medium is effected towards a transfer aperture (128) within the cell, thereby concentrating the insoluble material within the bulk medium. Thereafter the insoluble material is removed from the concentration within the bulk medium through the aperture (128) and deposited onto the surface (136).

21 Claims, 17 Drawing Sheets

METHOD OF AND APPARATUS FOR TRANSFERRING MATERIAL FROM A BULK MEDIUM

BACKGROUND OF THE INVENTION

The present invention relates to a method of transferring material, preferably particles, from a bulk medium, preferably a fluid and, more particularly, to a method which can be used for printing.

Various filtration and separation techniques are known utilising electrophoretic and similar processes.

GB-A-1 186 184 discloses separation apparatus which combines electrophoresis and bulk flow to effect a separation of one or more components which are uniformly or non-uniformly dissolved or dispersed in one or more relatively continuous fluids to be partly or wholly separated from each other and/or from the fluid or fluids. The fluid flows in an annulus between an inner fixed cylinder and outer rotating cylinder in the presence of an electric field.

U.S. Pat. No. 3,909,383 shows a cleaning process which uses known electrophoretic technology to clean contamination from liquids which are used for developing images in electrophotographic printing systems which use liquid toners. The cleaned liquid can be re-used while the filtered solid is removed for subsequent disposal.

EP-A-0 320 709 discloses an electrophoretic separation technique similar to those mentioned above.

WO-A-88 09210 discloses that, instead of using electrophoresis as a means of cleaning a liquid containing particles of various types, ultrasound can be deployed to drive particles across a flowing liquid such that they can be collected.

GB-A-2 098 498 relates to a separation technique which also uses ultrasound to deflect particles in a flowing liquid in order to clean the liquid. In the method described, a means is employed which causes a drift in the ultrasound field which causes particles to be swept across the flow to a collection point. The contaminant particles can be removed periodically.

In U.S. Pat. No. 4,011,157 the object of this invention is to remove, or filter, particulate matter from a contaminated liquid so that the cleaned liquid can be reused. The method utilises known ultrasonic nebuliser technology to separate liquid ink from particulate contaminant. The cleaned liquid ink (free from particulates) is transferred back to the print station while the solid contamination is collected in a tank for disposal.

WO-A-93 20927 discloses a method which makes use of the known phenomenon of dielectrophoresis to separate particles which are suspended in a liquid which flows through a cell. It is also recognised that this type of system can be used to concentrate particles, although no application of the phenomenon is given.

EP-A-0 307 940 discloses using a laser to trap a biological particle.

FR-A-2 232 192 discloses using an alternating magnetic or electric field to maintain an ink containing magnetic particles in a useable form i.e. prevent it from solidifying, and then using a superimposed static field to eject fluid from the container. The patent specification also teaches that, by making the electrodes or pole pieces pointed, the fluid which is ejected can be concentrated.

CH-A-562 631 shows a mixing and separation technique for particles in a gas and weighing less than $10^{-22}$ g in weight, using donor and acceptor streams and an electric field.

*Field Flow Fractionation*—JC Goodings Chemical & Engineering News, Vol 66, No. 41, Oct. 10, 1988 summarises many of the techniques listed in the above patent specifications. A fluid containing particles flows through an external field, or gradient such as an electric or magnetic field, or a thermal gradient, which is orthogonal to the flow direction. Different fractions are deposited at different locations in the flow stream.

All of the above are based on known effects and they have been used to separate dispersed particles from a liquid, for example to clean the liquid.

U.S. Pat. No. 4,717,926 & U.S. Pat. No. 4,928,125 describe printing techniques using electric fields and magnetic fields respectively.

SUMMARY OF THE PRESENT INVENTION

An object of the present invention is to achieve concentration of insoluble particles dispersed in a liquid at a transference location and then to transfer this concentrate out of the bulk onto a surface, for example for printing on to the surface.

In PCT/AU92/00665 there is disclosed a method in which discrete agglomerations of particles are generated from a liquid having the particles therein, and an electric field provided at an ejection location in order to cause ejection of the particles from the body of liquid by electrostatic means.

The present invention is concerned with developments of the concept disclosed in that earlier application. In that earlier application a method was disclosed in which particles in a fluid were brought (in an ejection head) to an ejection location by a flow of the fluid towards and then away from the ejection location. The fluid flowing towards the ejection location contains particles which are caused to accumulate at the ejection location before being ejected therefrom and the fluid flowing away is thus depleted. However, causing such a flow requires the provision of a pump or similar, significantly increasing the cost of the system above that of the ejection head itself.

The present invention aims, amongst other things, at reducing the complexity and cost of such a method and system.

According to the present invention therefore there is provided a method of depositing material on a surface, the method comprising:

supplying, to a transfer station, a bulk medium in the form of a composition of dispersed insoluble material and a support medium;

effecting a movement of the insoluble material within the bulk medium towards a transfer location within the transfer station and thereby concentrating the insoluble material within the bulk medium at the transfer location; and thereafter removing the material from the concentration within the bulk medium at the transfer location and depositing the material onto the surface.

Thus, the method can be used to maintain a predetermined level of concentration of the insoluble material in the support medium during normal usage.

Particle 'flow' within the bulk medium, preferably a fluid, therefore may enable one to dispense with a flow of the bulk medium containing the particles, so that the complexity and cost associated with pumps etc., can be avoided. In such cases, the bulk medium acts simply as a support or carrier for the particles, but not as a transport medium.

The invention also includes a material transfer apparatus comprising a fluid-containing cell having insulating walls, an aperture, an inlet for fluid and an outlet for fluid; a first electrode at least partially surrounding the cell; a second, ejection, electrode disposed in the aperture. The apparatus may form part of a printer.

One particular use of a method of the invention is in the field of conventional drum-based electro-photography to supply toner material to the drum from its support or carrier medium. In conventional processes depletion of the concentration of toner within the carrier occurs over the whole volume of the mixture. When the concentration has weakened to a given level, the toner cartridge or the like has to be replaced even though there are still toner particles in the mixture. The present invention is capable of using a greater percentage of the toner, by maintaining a selective concentration at a position from which the toner transfer to the drum occurs.

In some cases the method of the invention may be employed together with a method which involves flow of the bulk medium. For example, flow of the bulk medium into a reservoir or container for replenishment may be desirable in certain printing techniques.

BRIEF DESCRIPTION OF THE DRAWING

Various transport mechanisms may be used to cause the concentration of particles and some of these are summarised below with reference to FIGS. 1 to 12 of the accompanying drawings. An example of a method and apparatus according to the invention are also described with reference to FIGS. 13 to 20. In the drawings.

DETAILED DESCRIPTION OF THE PREFERRED EMBODIMENTS

Figure 1:
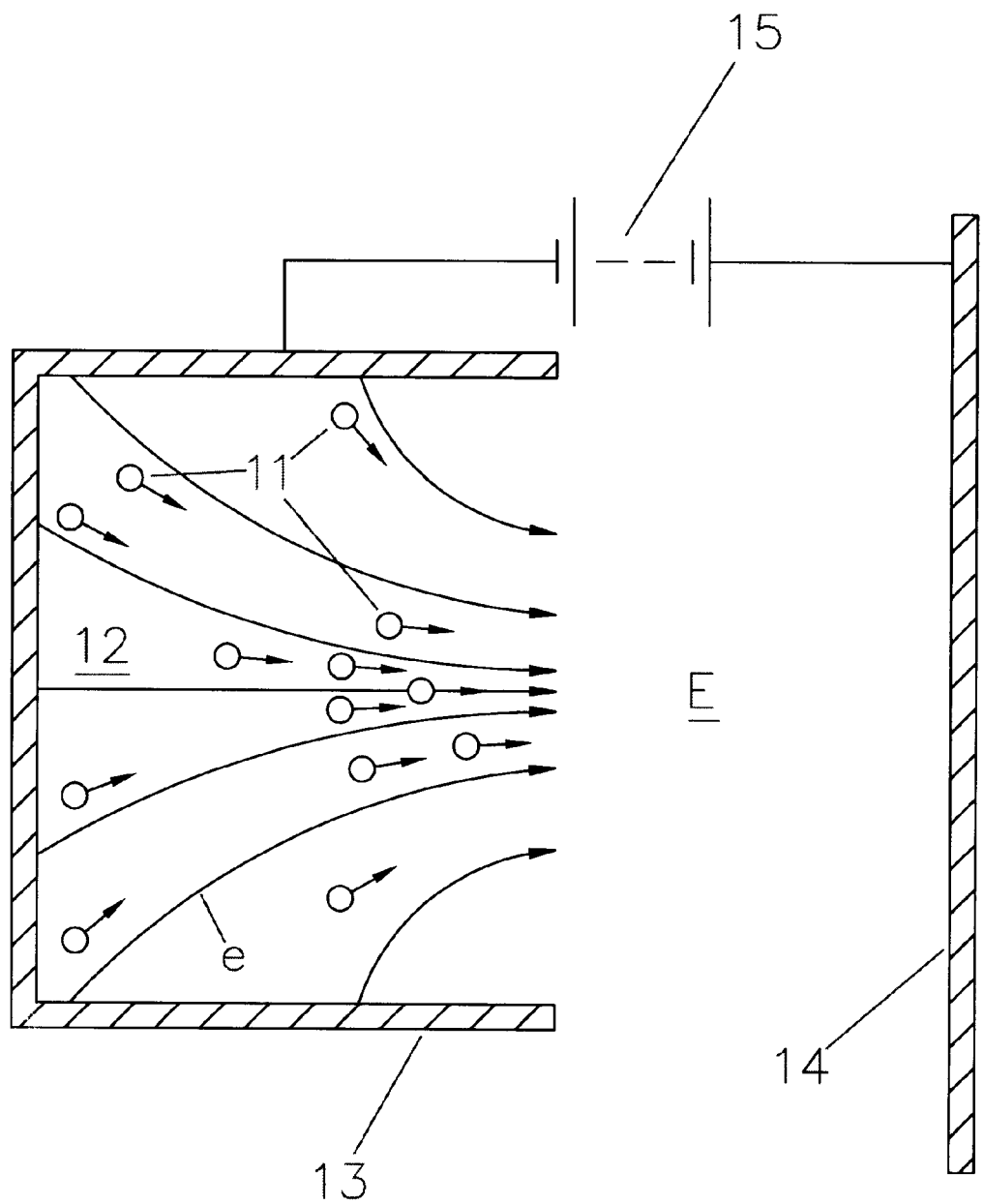
FIG. 1 illustrates an electrophoretic mechanism.

FIG. 1 shows an electrophoretic process in which charged particles 11, supported in a liquid or gel-like support medium 12 are caused to move in an electric field E applied across electrodes 13,14 by a battery or other DC source 15. Arrows on the particles 11 indicate their direction of movement along the field lines e in the electric field E and concentration occurs when particles either encounter a hindrance or the electric field lines converge as shown. Electrophoretic methods according to the invention include cases in which the particles are 'pumped' along by an array of electrodes mounted along a channel and switched sequentially with suitable time delays.

Figure 2:
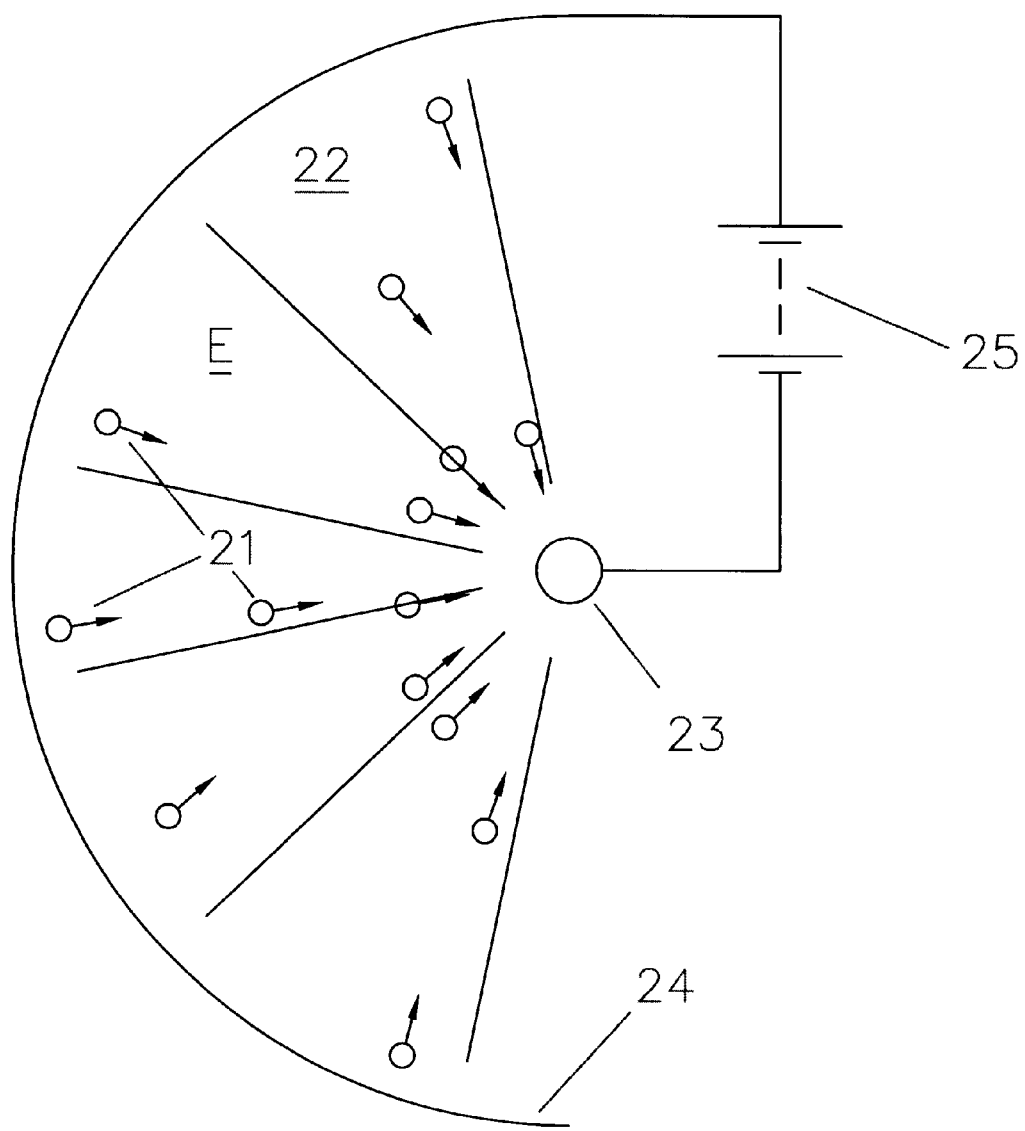
FIG. 2 illustrates a dielectrophoretic mechanism.

In FIG. 2 a method is shown, in which uncharged particles 21 whose dielectric constant is significantly different from that of a carrier fluid 22 experience a force in a non-uniform electric field E applied across electrodes 23,24 by a DC source 25. The field induces dipoles in the particles 21 on which the non-uniform field acts to move the particles in the direction of increasing field strength (electrode 24) (independent of direction of the field). Concentration occurs since the field strength increases when the field lines e converge or when particles encounter an obstacle.

Figure 3:
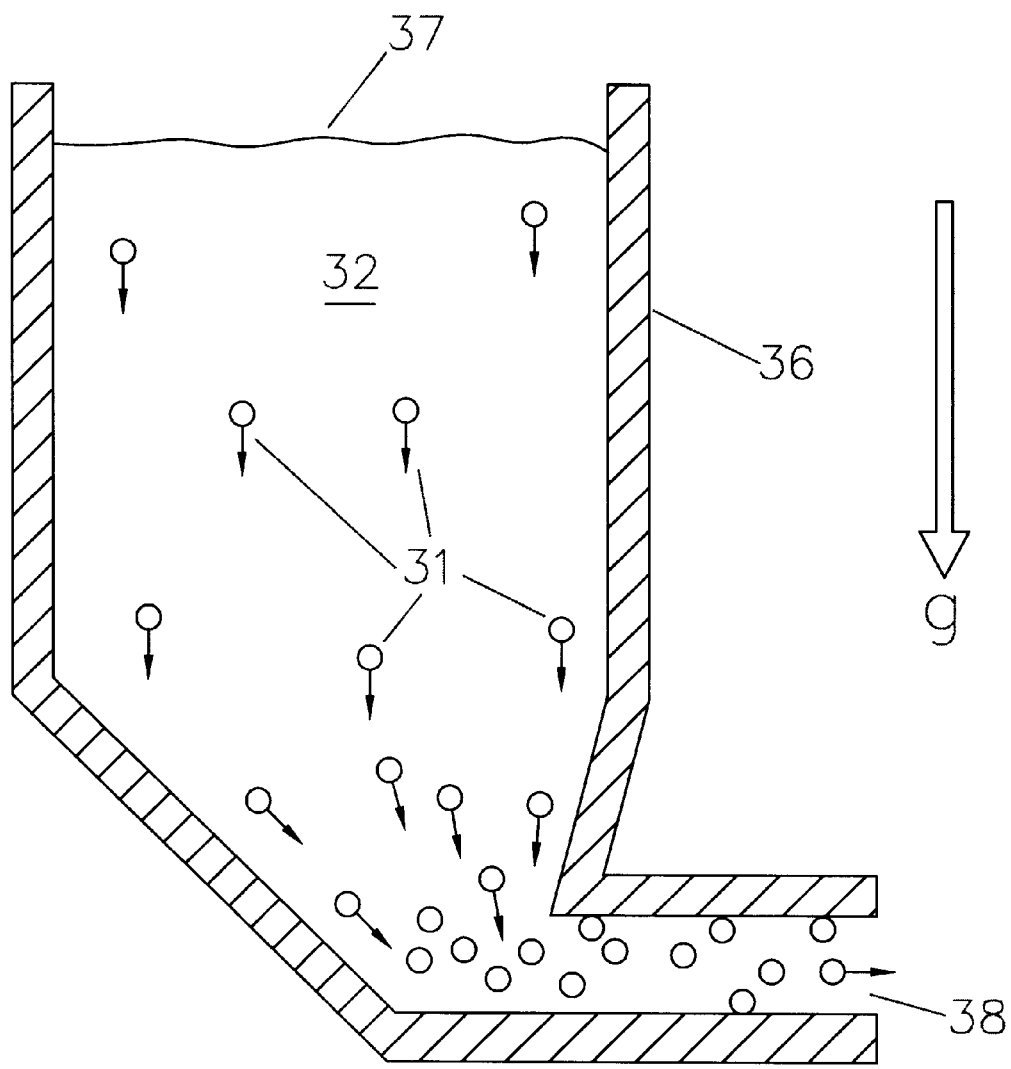
FIG. 3 illustrates a method involving sedimentation and floatation.

In the method of FIG. 3, particles 31 having a density different from a carrier liquid 32 are contained in a vessel 36 and experience a buoyancy force in a gravitational field g, leading either to sedimentation (as shown) or to floatation. Concentration occurs when the particles 31 encounter a barrier, usually either the bottom of the container 36 or the fluid surface 37. Particles are then removed through the opening 38 under the action of electrostatic forces as described above.

A more sophisticated concentration process can be made to occur by allowing particles to sediment (or float) in the presence of another carefully chosen species of particle. In this case a phenomenon known in the literature as "enhanced sedimentation" takes place which results in local increases in concentration of both species of particle with higher rates of sedimentation.

Figure 4:
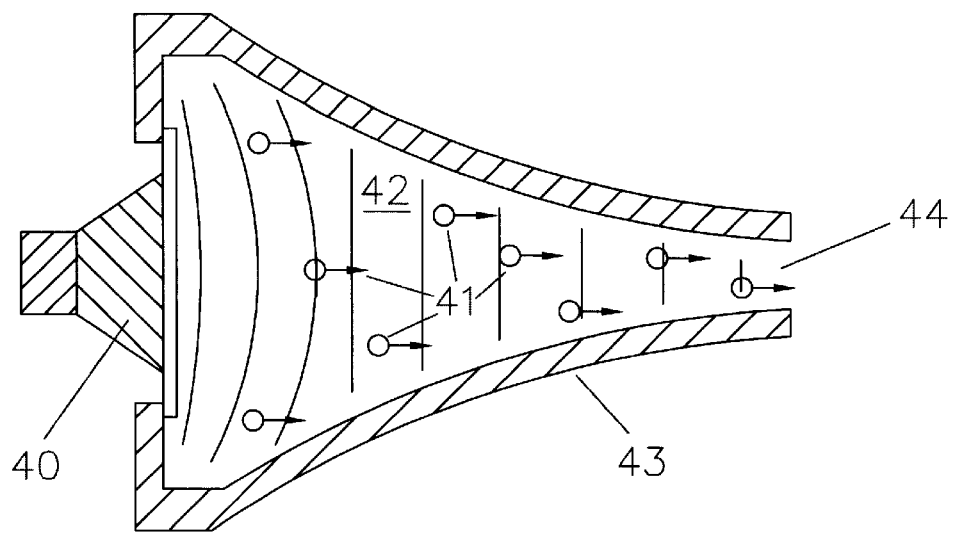
FIG. 4 illustrates a method of acoustically driving particles.

The method of FIG. 4 shows how an acoustic disturbance, preferably at ultrasonic frequencies, caused by for example a piezoelectric transducer 40, and passing through a bulk carrier medium 42, is able to exert pressures on the boundaries of particles 41, resulting in their motion as shown. The particles may accumulate at a boundary, or at locations in space, depending on the nature of the acoustic field, but in this case accumulate in a funnel 43, from an end opening 44 of which they are removed as described above.

An intense sound field could be used to drive the particles towards an ejection location or by establishing a standing wave pattern having a node at the rear of the ejection location.

Figure 5:
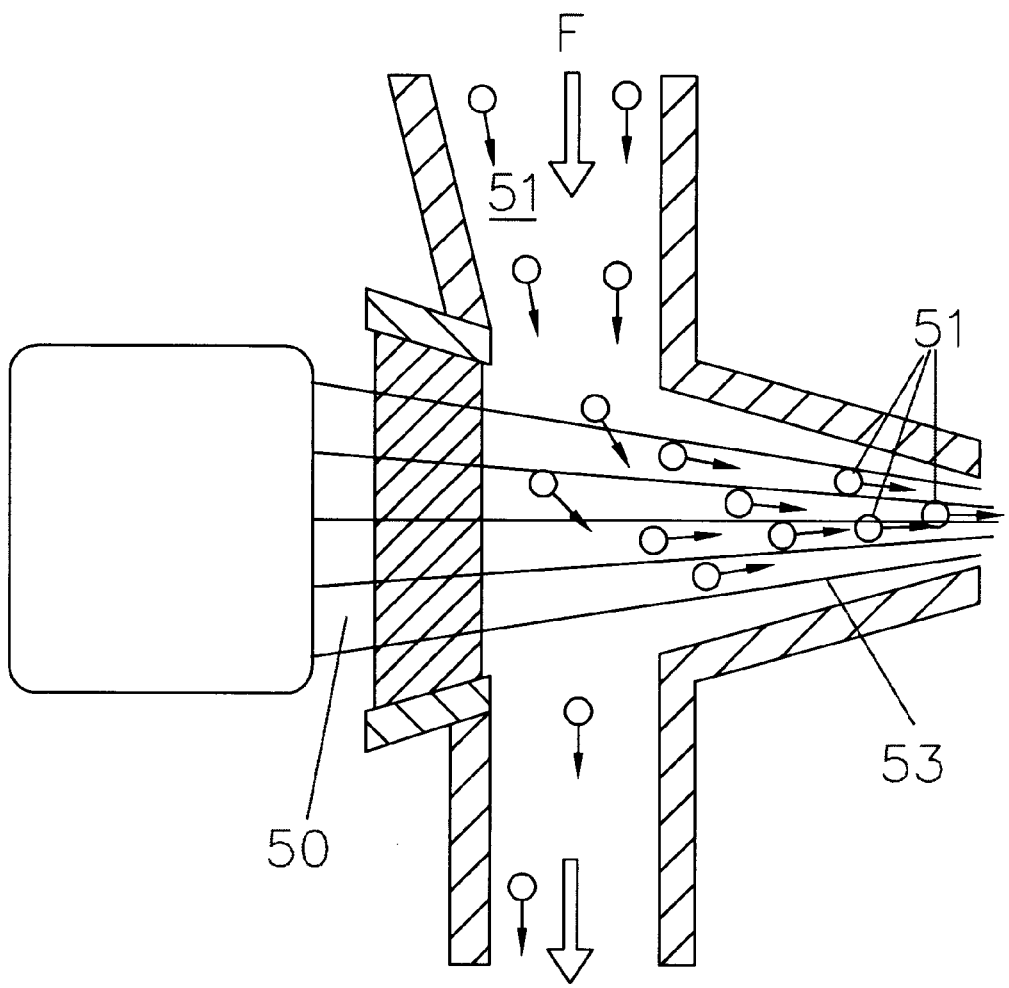
FIG. 5 shows a method of optically driving the particles.

As illustrated in FIG. 5, a light beam 50 passing through the system shown in FIG. 5, usually a laser beam of sufficiently high energy, is able to exert a force on particles 51 and not on the carrier fluid 52 if it is transparent to the light. The magnitude of the force depends on whether the light is reflected or absorbed by the particles. Concentration occurs when the particles encounter a barrier or when the beam geometry 53 is convergent as indicated and particles 51 are removed as before. A laser beam could in principle be used to nudge particles out of a passing stream in the direction of arrow F towards an ejection location.

Particles whose density is different from that of the carrier fluid will sediment or float under a centrifugal acceleration just as they will under gravity. Concentration occurs for the same reasons. However, at high enough rotation rates, particle inertia may also lead to motion relative to the fluid.

Figure 6:
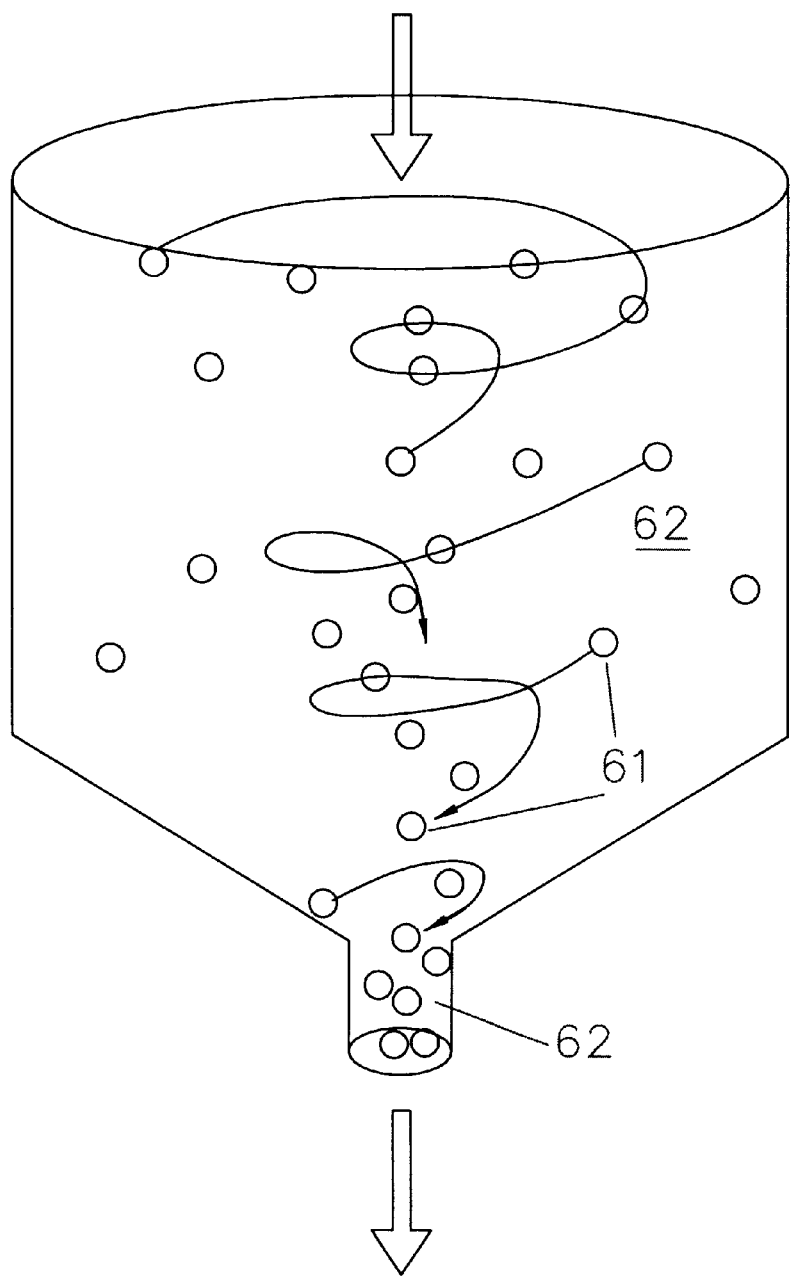
FIG. 6 shows a method of centrifugation for moving the particles within the bulk support medium or carrier.

As illustrated in FIG. 6, particles 61 less dense than the carrier fluid 62 could be concentrated on the centreline of a rotating fluid body and extracted as needed through outlet 62 in the direction of arrow F.

Figure 7:
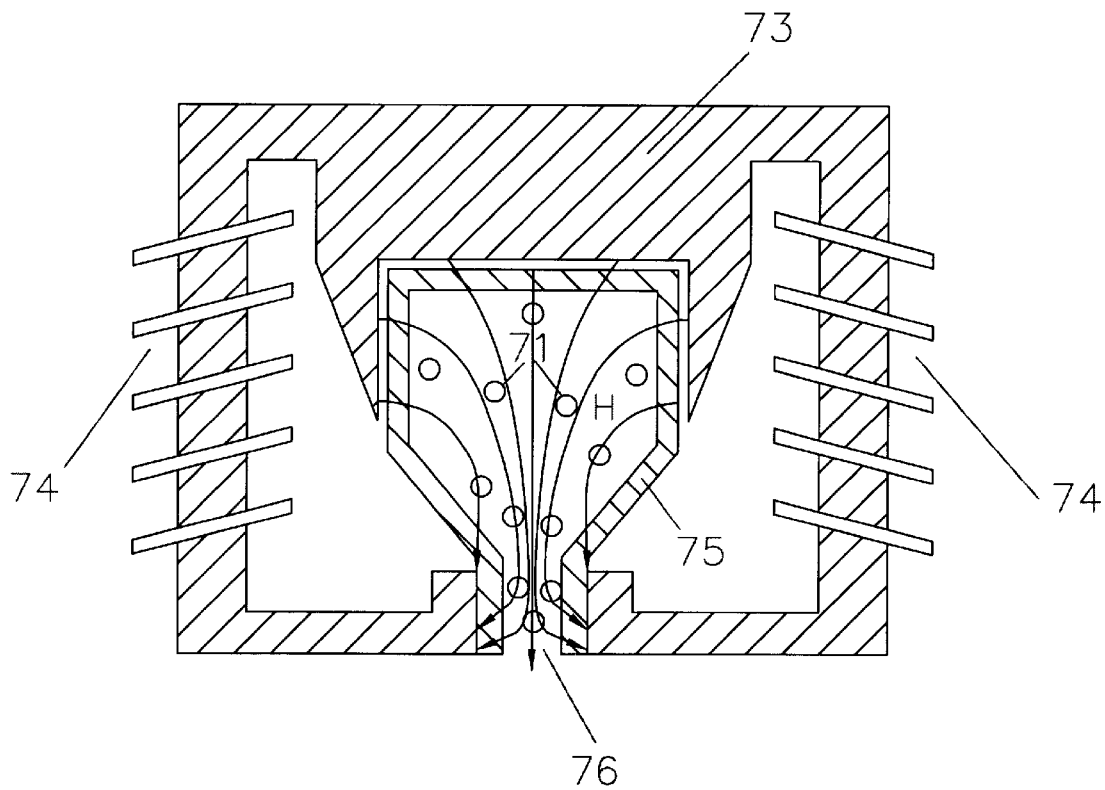
FIG. 7 shows a method of magnetophoretically moving particles.

As illustrated in FIG. 7, magnetophoresis occurs when particles 71 carry a net magnetic dipole moment. Particles 71 will align with and move in a non-uniform magnetic field H, much like dielectrophoretic motion. The system requires a suitably configured magnetic field H provided by an armature 73 and coils 74 which surround a container 75, the ejection location 76 for the particles being near a pole.

Figure 8:
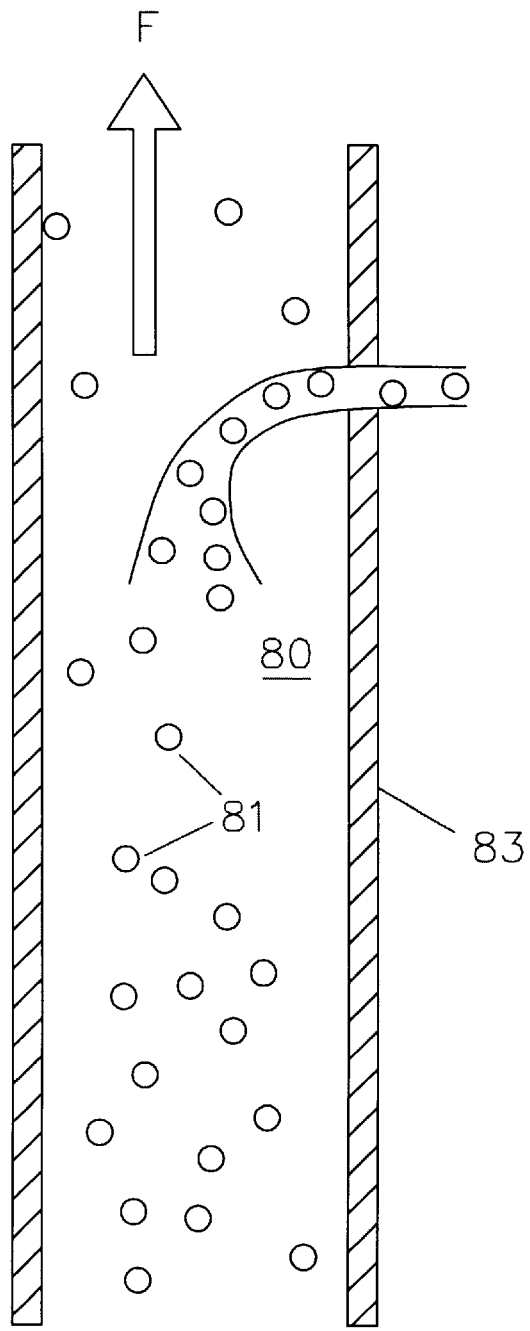
FIG. 8 shows a method utilising specific bulk flow geometries.

It is known that certain bulk flow geometries lead to accumulations of suspended particles when the particles' Reynold's Numbers are not small, that is, the phenomenon is a consequence of the particles' inertia. An example, illustrated in FIG. 8, is the flow of a suspension 80 along a tube 83 where it has been found that the particles 81 concentrate within the bulk medium in an annulus at some distance between the centreline and the wall. Thus the particles are concentrated across the direction of flow F. Another similar example (not shown) is a stagnation point flow in which the particles accumulate around the stagnation point at which the flow velocity goes to zero (the lee of an obstacle is an instance).

Figure 9:
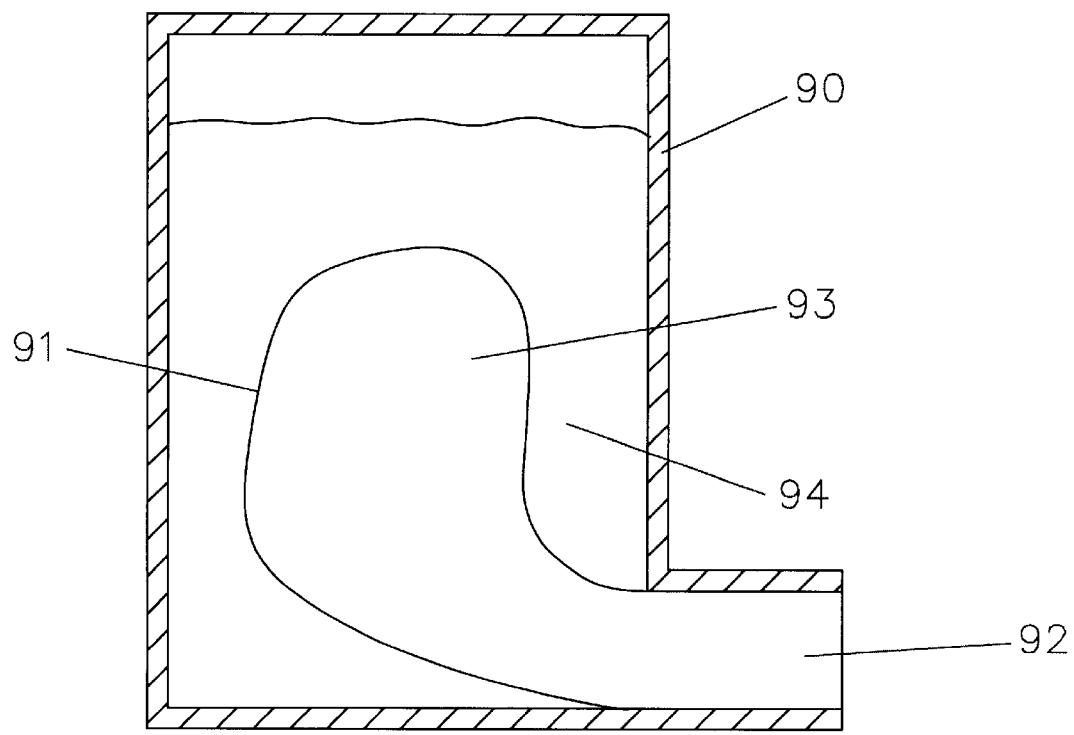
FIGS. 9 and 10 illustrate a method involving the use of a collapsible membrane.
Figure 10:
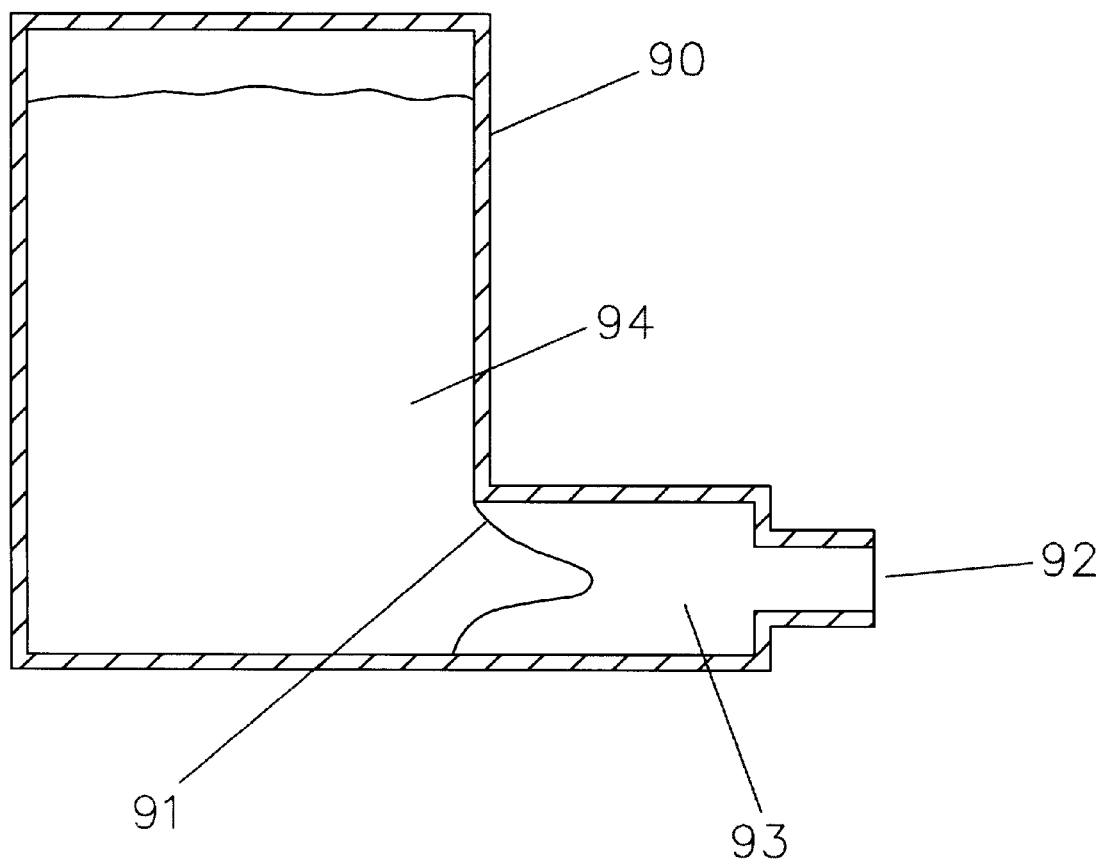

FIGS. 9 and 10 illustrate a concentration technique in which a container 90 has collapsible semi-permeable bag 91 which separates a concentrated dispersion 93 of particles from a depleted dispersion 94 as particles are ejected from the ejection location 92 by one of the methods described above.

Figure 11:
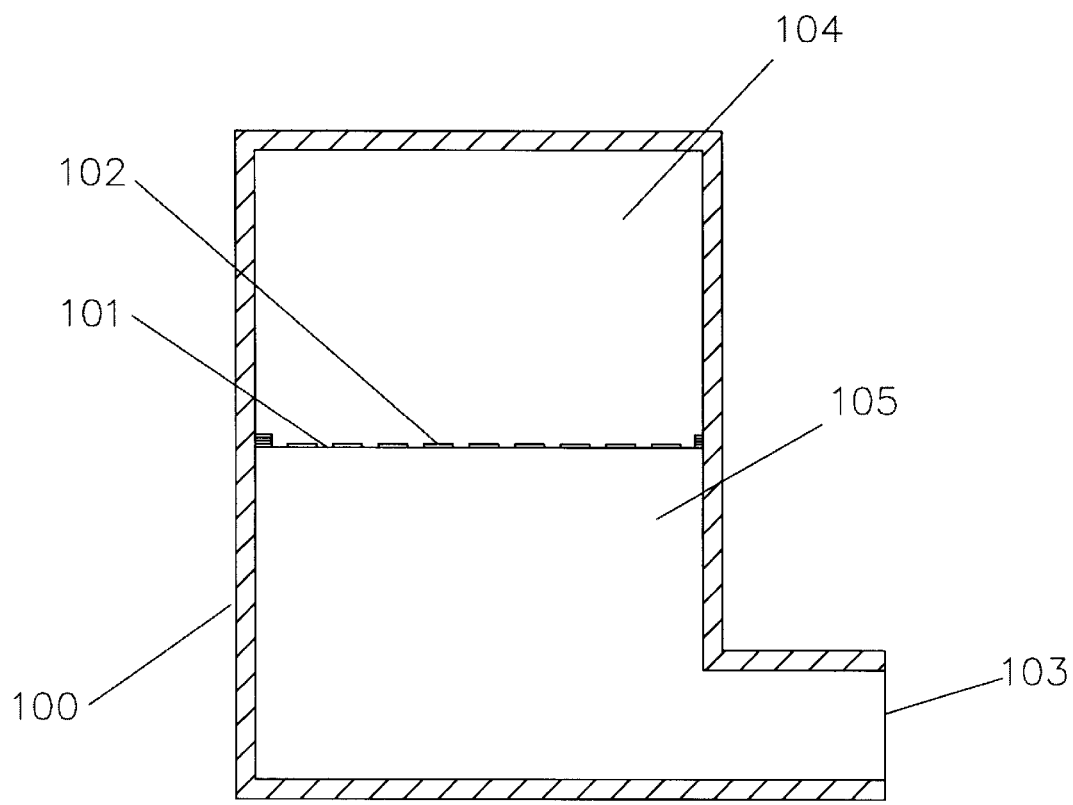
FIG. 11 illustrates a similar method to that of FIGS. 9 and 10, but using a membrane supported on a movable mesh; and, FIG. 12 shows a method in which a continuous supply of a dispersion is provided.

FIG. 11 illustrates a similar technique, in which a semipermeable membrane 101 is supported on a mesh 102 which is allowed to move downwardly (causing a depleted dispersion 104 and a concentrated dispersion 105 as shown) within a reservoir 100 as particles are ejected at 103 by one of the methods described above.

Figure 12:
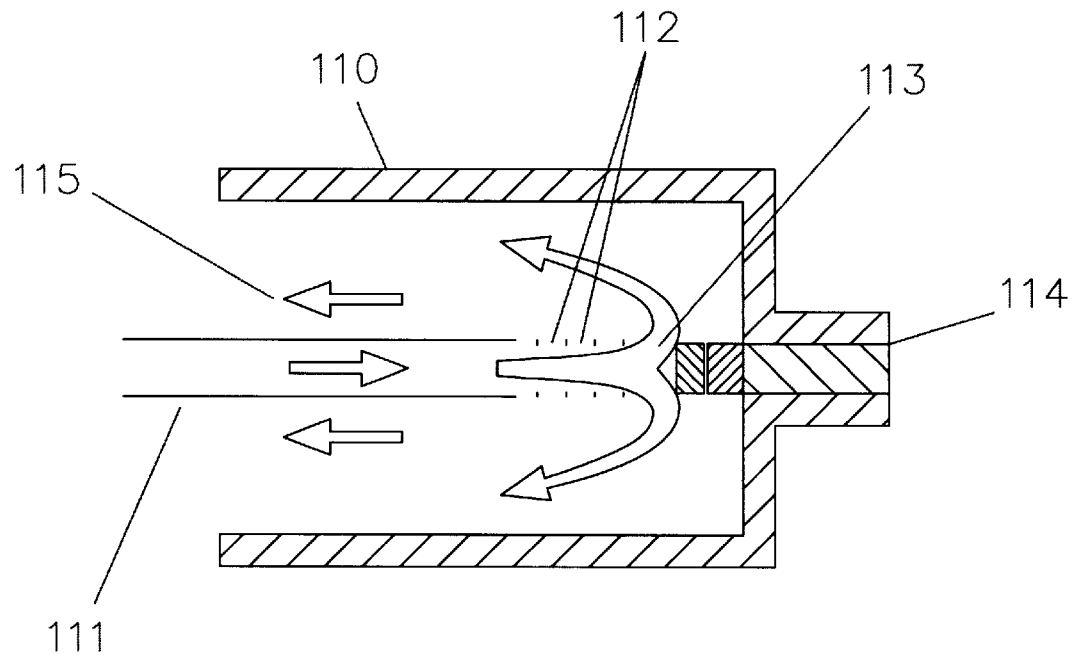

FIG. 12 shows a technique in which particles are concentrated within the body of fluid as the dispersion flows in a path through a reservoir 110 with a central supply feed tube 111 having longitudinally spaced outlets 112 covered by a porous wall portion 113 and through which the dispersion flows into the reservoir, the particles being concentrated in the body of fluid at the end of the porous section of the supply tube and being removed for ejection at the ejection location 114, again by one of the techniques referred to above. A depleted outflow occurs at 115.

FIGS. 13 to 16 show a printhead which incorporates the principles of the present invention, using an electrophoretic method (as described generally above in connection with FIG. 1) of concentrating insoluble ink particles. The printhead shown and described provides single pixel printing on a surface.

Figure 13:
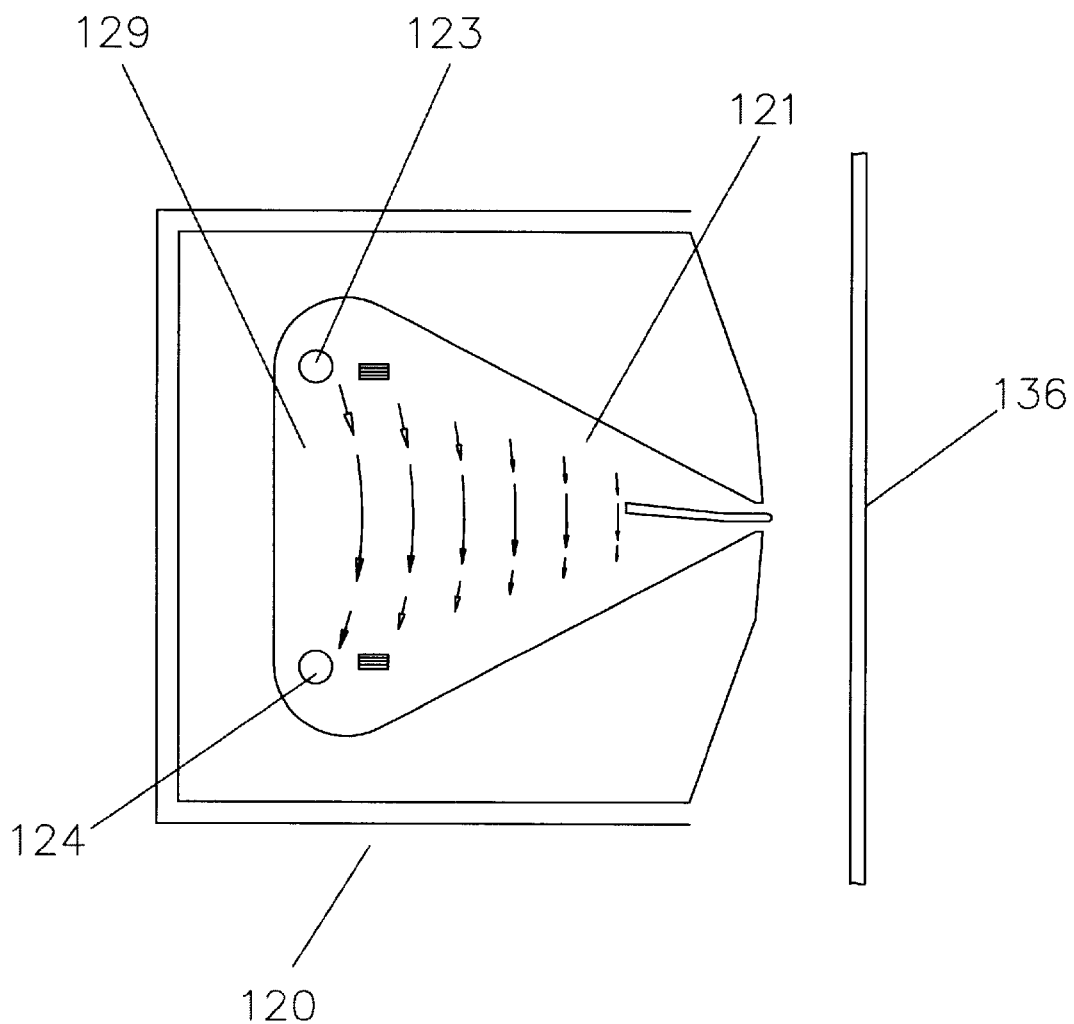
FIG. 13 illustrates, diagrammatically, a cell of a printhead in section, together with flow vectors.

The printhead utilises a concentration cell 120 of generally triangular internal shape, providing a cavity 121 to which an ink 122 (of a type which will be described later) is supplied under pressure (for example from a pump—not shown) through an inlet 123. To enable continuous operation, an outlet 124 is provided so that a flow vector distribution, as indicated in FIG. 13 by the arrows, is produced in operation. The cell shown has external dimensions of 10 mm width, 13.3 mm overall length and thickness 6 mm.

Figure 14A:
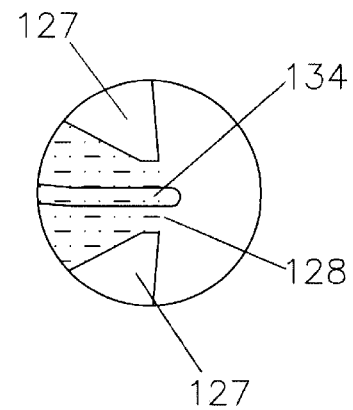
FIGS. 14 to 15A illustrate the same cell in greater detail, in section.
Figure 14:
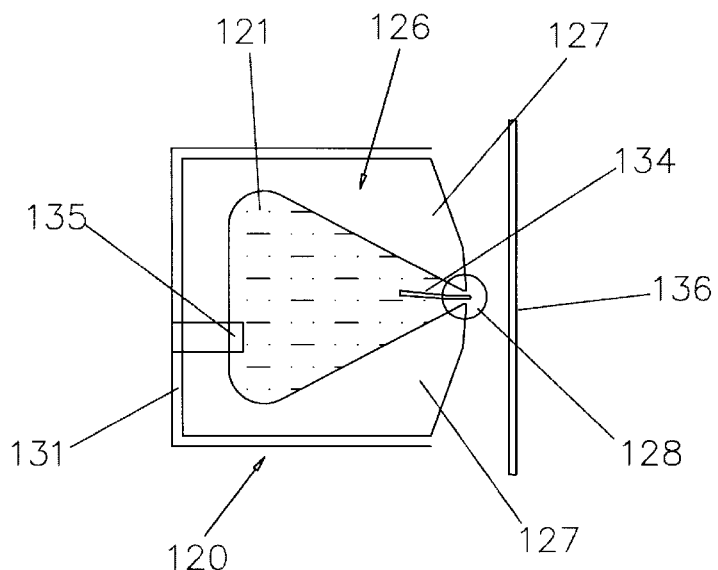
Figure 15:
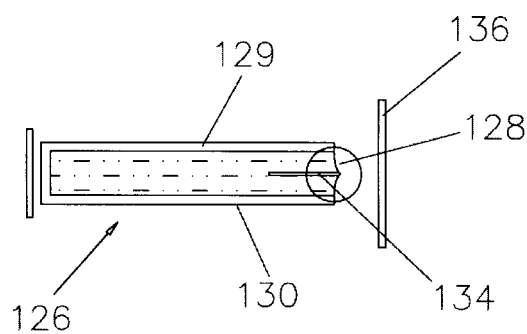
Figure 15A:
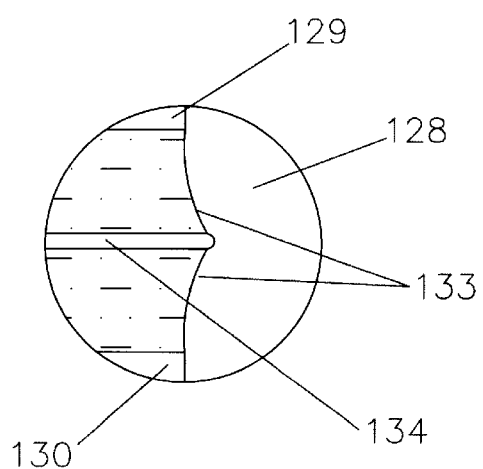

The cell 120 comprises a PEEK (Poly Ether Ether Ketone) housing 126 which, in section as seen in FIGS. 14 & 15, has opposed generally wedge-shaped cheeks 127 which define the triangular shape of the cavity 121 and an aperture 128. The aperture 128 has a width of about 100 μm. FIGS. 14A & 15A illustrate, respectively, details of the aperture 128 and the ink meniscus 133 which is formed there in use. At each wide face, the cell is closed by plastics side walls 129,130 which form part of the housing 126. The housing 126 may form part of a larger assembly providing support fixings and the like. These are not shown as they do not affect the principle of operation and are unnecessary in the present context.

Figure 17:
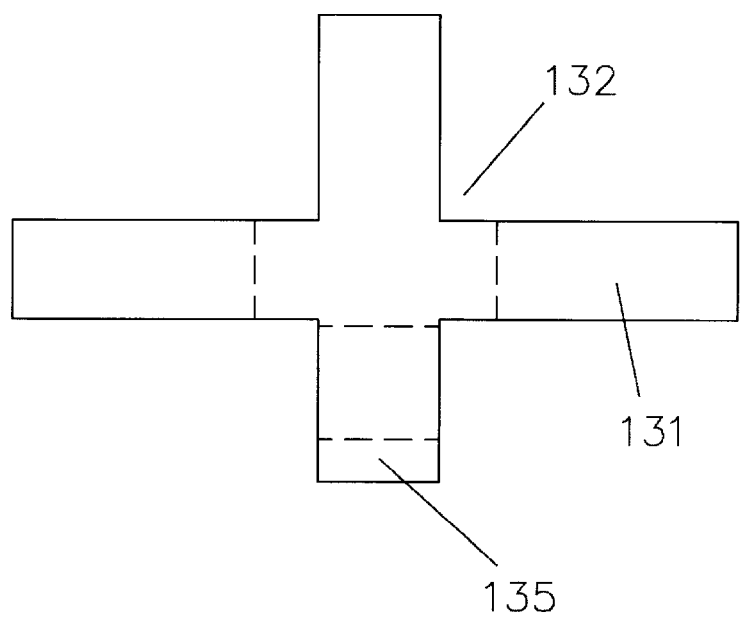
FIG. 17 shows a blank from which an electrophoretic electrode is made.
Figure 16:
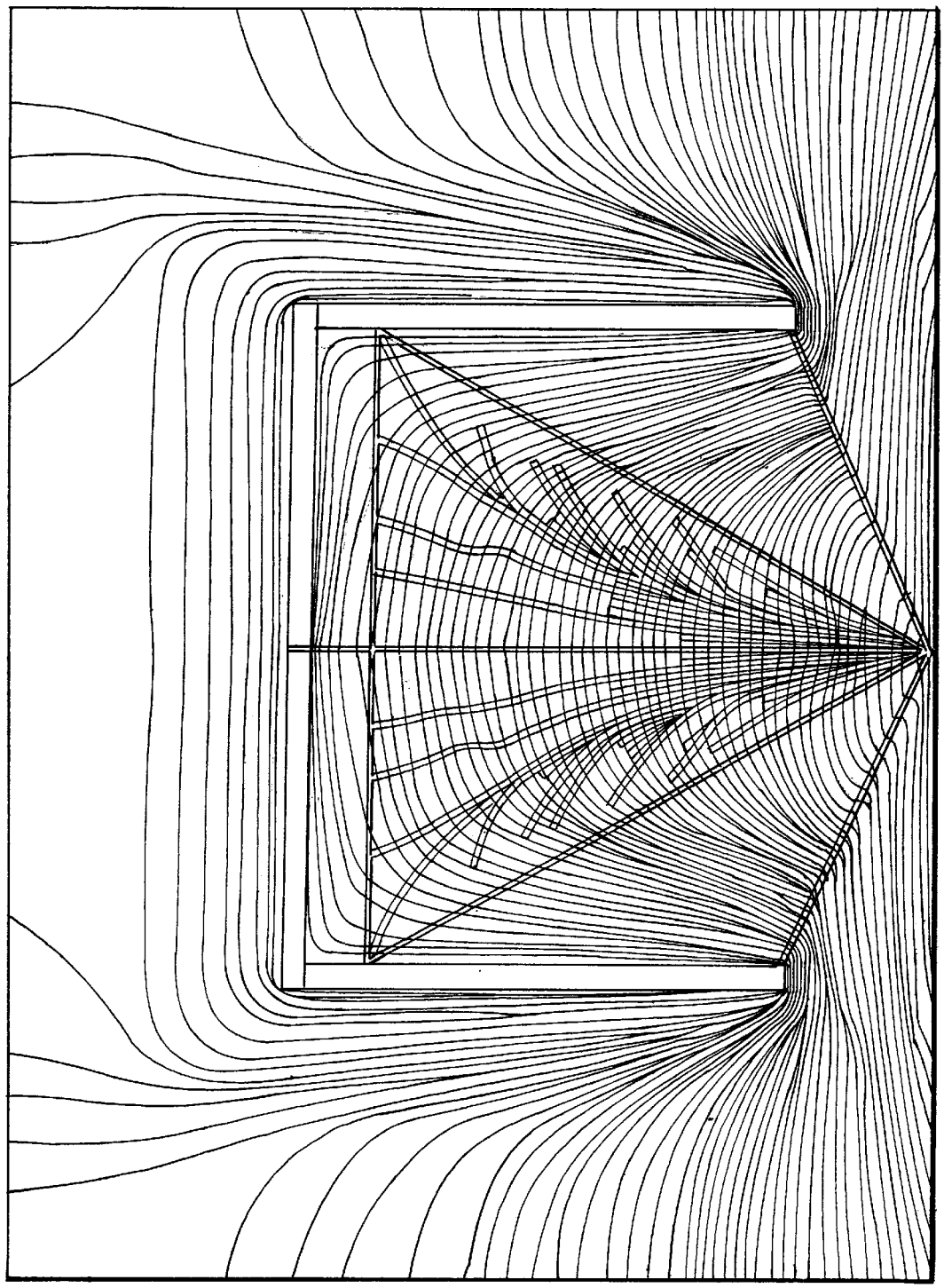
FIG. 16 shows the paths of ink particles in an electrostatic model of a cross-section of the printhead.

Disposed around the outside of the cell 121 is a thin plate-like electrode 131 formed from a stainless steel blank 132 shown in FIG. 17. The electrode 131 surrounds the narrower side walls provided by the cheeks 127 and the base portion of the plastic housing 126 and has a tab or tongue 135 which projects into the cavity 121 in order to make contact with the ink 122. The electrode 131 (known as the electrophoretic electrode) and the cheeks 127 are shaped such that, in use, a component of electric field vectors E in the liquid directs the insoluble ink particles away from the walls of the cell. In other words, E·n>0 around most of the perimeter of the ink cell 120, where E is the electric field vector and n is the surface normal, measured from the wall into the liquid. This ensures that the insoluble ink particles are not adsorbed on the perimeter of the cell which would otherwise modify the electric field of the cell. FIG. 16 shows the paths described by ink particles in an electrostatic model of a cross-section of the cell having an external ejection electrode. The viscosity of the liquid and the charge on the particles is such that the particles follow the field lines very closely, as can be seen in the figures.

Figure 18A:
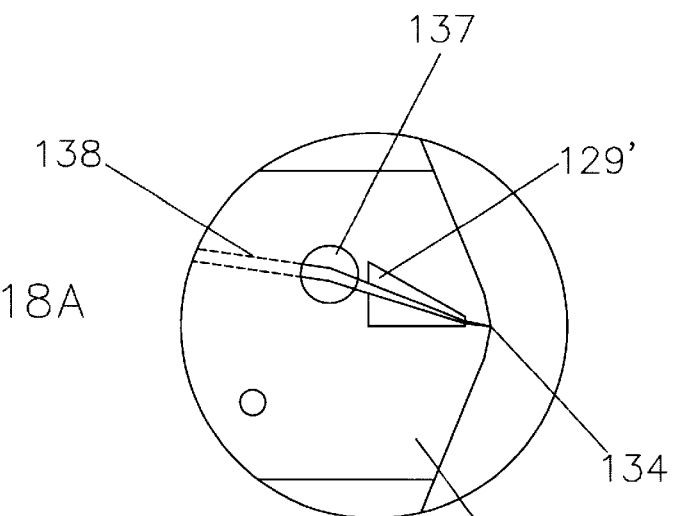
FIGS. 18,18A & 19 show elevations of an ejection electrode for the printhead, FIG. 19 showing the electrode in position.
Figure 18:
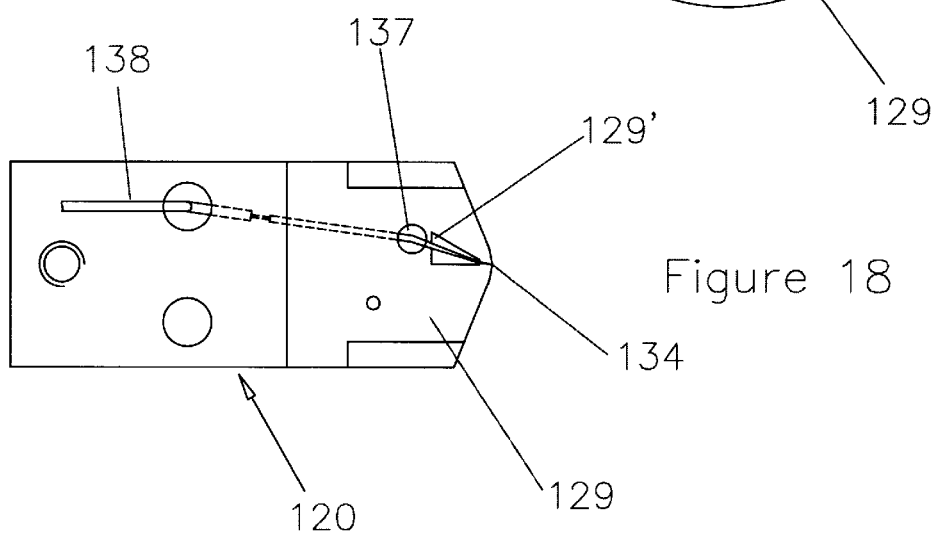
Figure 19:
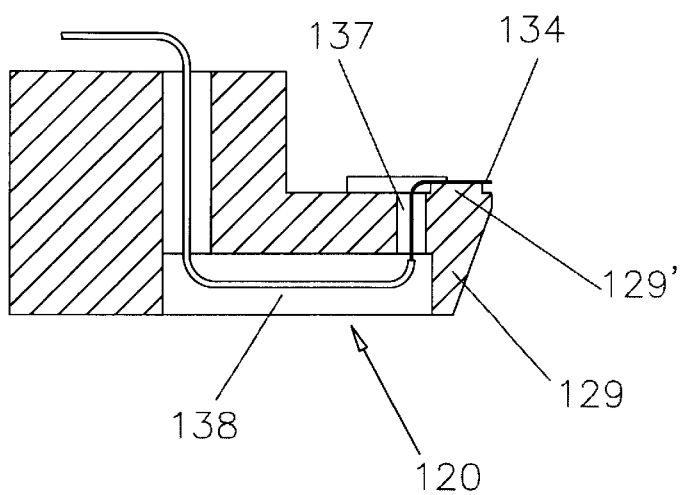
Figure 20:
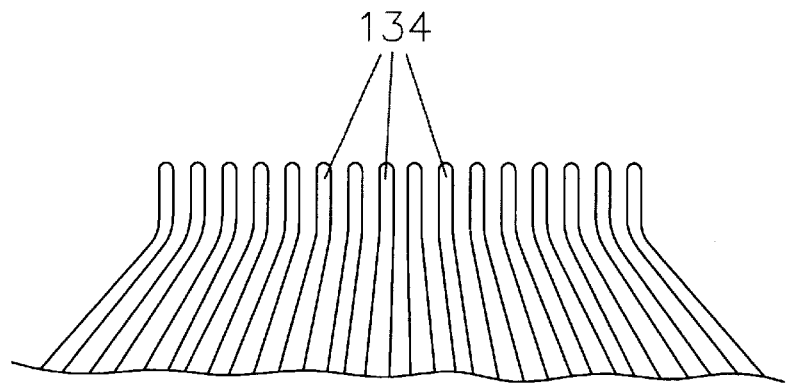
FIG. 20 shows the arrangement of a multiple-electrode assembly for an alternative cell construction.

Within the aperture 128, there is disposed an ejection electrode 134 (in an alternative embodiment, for multiple pixel printing, plural electrodes 134' may be provided in a linear array as illustrated in FIG. 20). The electrode 134 is electroformed nickel of 15 μm thickness with a cross-section typical of electroformed parts. One face of the electrode is flat and the other face is slightly curved. FIGS. 18, 18A (in greater detail) and 19 show the ejection electrode 134 and its positioning within the cell 120 in detail. The ejection electrode 134 is mounted on an upstanding support 129' which is formed integrally with the side wall 129 of the housing 126 and the electrode 134 projects through the aperture 128 a distance of between 50 to 100 μm (see FIG. 14A also). An electrical connection is provided by a wire 138 which passes into the cavity 121 though a further aperture 137 in the side wall 129, the aperture being epoxy filled during assembly in order to pot the wire in place and seal the aperture 137.

The insoluble particles acquire a charge due to the action of a particle charging agent which ionises in solution, with the result that the insoluble particles acquire a charge and counter ions are formed of equal and opposite charge. This mechanism is well-known in the field of liquid toners, eg for photocopiers, and electrophoretic displays.

The operation of the printhead will now be described. When printing is not occurring, the respective charges on the electrophoretic electrode 131 and the ejection electrode (the electrophoretic electrode has an applied potential of 1.2 to 2.0 kV) cause the ink particles to move electrophoretically towards the ejection electrode. Since the electrophoretic electrode 131 is in contact with the ink within the cell, through the contact 135, the potential of the ink at equilibrium will be the same as that of the electrophoretic electrode 131. This results in a net concentration of particles near the ejection electrode 134. When an ejection pulse (pulses are of 200 V to 1.5 kV, of duration 50 to 200 µs, and may be at a frequency of 1 to 10 kHz) is applied to the ejection electrode 134, ink particles are ejected (in the manner described in PCT/AU92/00665) onto the surface 136 (together possibly with a small quantity of the carrier liquid adhering to the particles) and the electrostatic equilibrium is disturbed, resulting in continued movement of particles to restore the depletion around the ejection electrode and maintain the concentration.

Ink is fed into the cell through the inlet 123 in the side plate 129 to ensure a constant supply of ink particles to the cell in the low concentration region between the inlet and the outlet 124, whereby particles can be concentrated into the region around the ejection electrode 134. The flow rate in the high concentration region around the ejection electrode is low, thus ensuring that particles which have been concentrated by the field are not subsequently swept away by the bulk liquid flow in these regions. In use, the electrophoretic electrode 131 is held at a positive (in this case) potential higher than the time-averaged potential of the ejection electrode 134.

The ink used preferably conforms to the ink described in PCT/AU94/00357, ie comprising a carrier liquid having a high electrical resistance (eg>$10^9$ Ω.cm) and insoluble marking particles dispersed within the carrier. Soluble or partially soluble resins or the like may be incorporated to disperse the marking particles and to function to bind the particle to a print surface in use. In addition, charge modifying agents may be included to assist the charging process.

Figure 21:
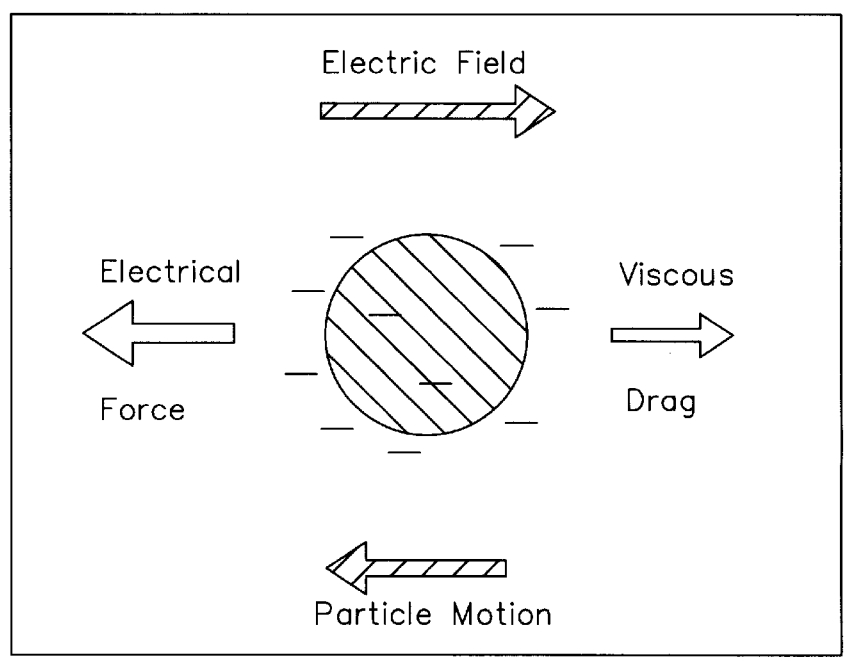
FIG. 21 is a diagram illustrating the principle of electrophoretic movement of particles.
Figure 22:
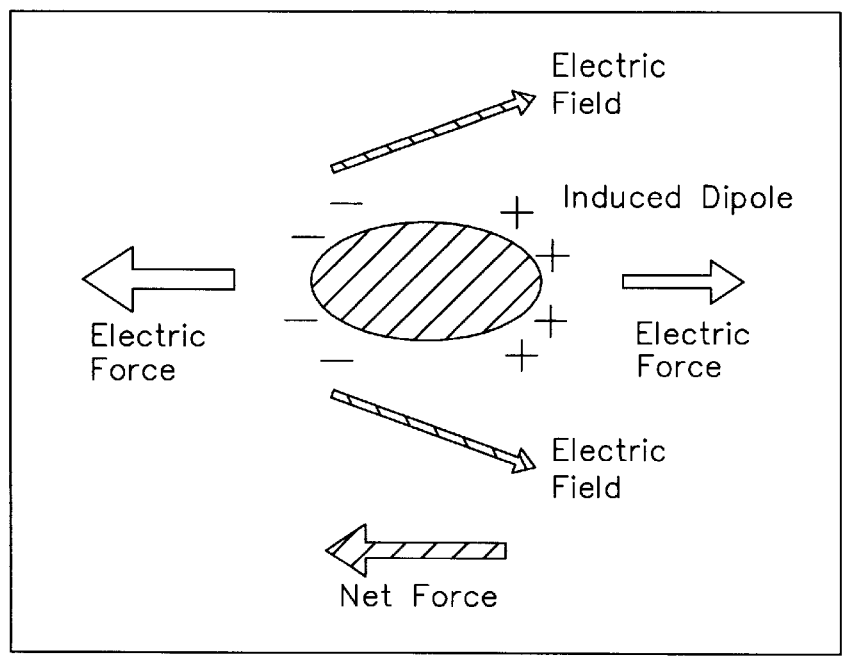
FIG. 22 is a diagram illustrating the principle of dielectrophoretic movement of particles; and, FIG. 23 is a diagram illustrating a conceptual model of a printhead which has electrophoretic concentration.
Figure 23:
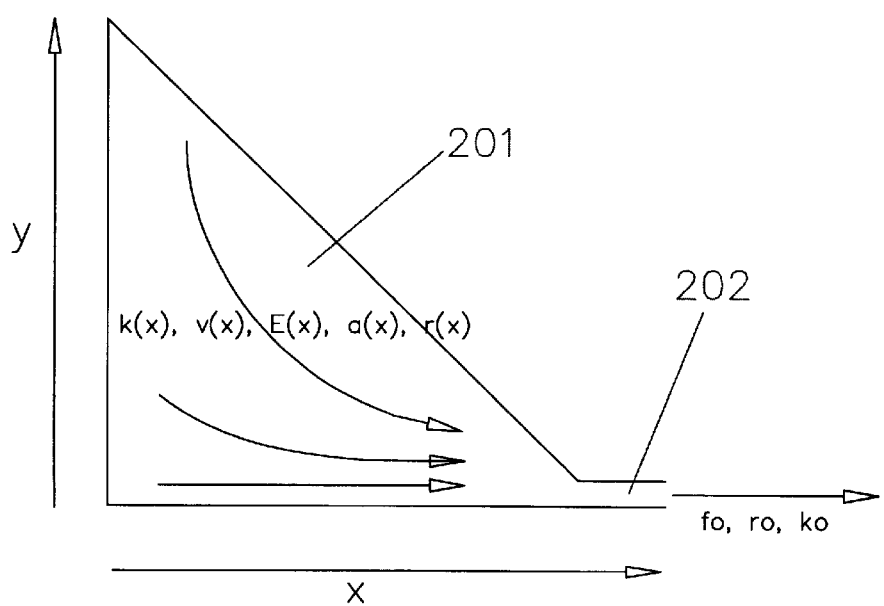

The following description is part of an investigation report prepared by the inventors in connection with aspects of the invention and describes particle transportation methods in connection with FIGS. 21 to 23.

Particle Transport

A mechanism has been identified which is a combination of a transport process which concentrates the particulates in a carrier fluid and a separate process (which can be an ejection process) which transfers them out of the carrier fluid. This appendix outlines the modelling work which has been carried out on the particle transport processes.

Simple Models of Particle Flow

A particle moving along the surface of a liquid experiences a reduced viscous drag as compared with a particle in the body of a liquid. The viscous drag is dependent on the detailed interaction of the particle with the surface of the liquid. The magnitude of the effective viscosity is not usually known, although we may postulate that it lies somewhere between the viscosity of the liquid and the viscosity of air. To confirm that our model of the transport process is a feasible explanation we compared particle motion along the outside of the electrode with that experienced in the body of the liquid. A list of potentials along the outside of the electrode was obtained from finite element field modelling. An interpolating function was fitted to the tangential potential distribution to obtain $E_{tangential}$ as a function of distance along the electrode. The equation of motion of the particles is:

$$Q\, E(x(t)) - M\, \vec{x}(t) - \dot{x}(t)\mu = 0$$

$$x(0) = x_{start}$$

$$\dot{x}(0) = 0$$

In which $\mu$ is the effective viscosity experienced by the particles and x(t) is the position of the particle along the surface of the liquid at time t. The equation was solved numerically for viscosities ranging between that of the carrier fluid and that of air—effectively zero. These numerical experiments confirmed that, in the body of the liquid, the particle velocities were too low to produce significant particle transport. At the surface, where the effective viscosity is lower, the velocities obtained from the model were much closer to those observed in practice. This provides partial confirmation that this model of the free surface transport is correct.

The discussion above shows how a particular transport method which relies on a free surface operates. This is not an attractive transport method for a practical product, particularly for an office environment, and alternative transport methods must be found. These methods are discussed below.

Alternative Transport Methods

Electrophoresis

This is the movement of charged particles under the action of an applied electric field. The field acts on the charge carried by the particles to produce a force which propels them through the suspending medium as shown in FIG. 21. The rate at which they move is characterised by their mobility and depends on their charge, radii and the viscosity of the fluid.

This force is of fundamental significance in the neighbourhood of the ejection point, since the electric force on the particles is primarily responsible for separating them out of the suspending fluid.

The action of this force on the particles can, if the physical boundaries of the fluid allow it, produce bulk motion in the fluid. This comes about because the viscous drag the fluid exerts on the particles corresponds to a transport of momentum from the particles to the fluid and this is equivalent to the action of a force at the centre of drag of the particle. Acting on a distributed set of particles, this amounts to a body force on the fluid. It will be shown that this motion can be useful as a means of bulk transport.

Gradient Diffusion

If a collection of particles is inhomogeneously distributed in space at one time, then at some time later the inhomogeneity will have been smoothed out. A mean particle motion occurs down the concentration gradient and hence the process is called gradient diffusion.

The mechanism is important because the removal of particles establishes concentration gradients down which particles may try to diffuse. In practice, however, the effect is small and it has not been observed to be a major part of the replenishment process.

Dielectrophoresis

An electric field which is non-uniform in space exerts a force on a particle having a dielectric constant different from that of its surroundings. This occurs even though the particle does not carry any net electrical charge. This force arises because the field induces equal and opposite charges at opposing ends of the particle, making an electrical dipole. However, because of the field non-uniformity, it interacts more strongly with the charge at one end than at the other, so producing a net force. This is illustrated in FIG. 22.

If the particle is charged, the dielectric force will generally be much weaker than the electrophoretic force exerted on the charge in the same electric field. However, where the field gradients are very high, as near the ejection point, the dielectrophoretic effect may be significant. For most common materials the direction of the force is towards higher field intensity, irrespective of the field's direction. Thus, near the ejection point, the dielectrophoretic force acts against the electrophoretic force.

Simple Model of 1D Electrophoretic Transport

FIG. 23 shows a conceptual model of a head which is electrophoretically replenished. Particles are lost from the ejection point at a rate which is determined by the printing rate requirements. The ejected particles must be replenished by particles held in the bulk of the ink storage. At any position, x, along the head there are defined the following quantities:

- a cross-sectional area a(x)
- a particle concentration k(x)
- a mean particle radius r(x)
- a velocity v(x)
- a viscosity $\mu(x)$
- an electric field E(x)

In equilibrium the electric field required to maintain the flow of particles is of the form:

$$E(x) \propto \frac{\mu(x) k_0 f_0 d^3}{Q/M(x) a(x) r(x) k(x)}$$

Where Q/M(x) is the charge to mass ratio of the particles, d is the ejected droplet diameter and the other quantities are as defined below. Thus the electric field required to transport the particles can be reduced by appropriate design of the particle mobility and by varying the cross-sectional area of the fluid reservoir. High mobility particles can be transported more rapidly with a given field. Varying the cross-sectional area reduces the field required by providing a larger number of particles per unit length of the reservoir. Reducing the electrophoretic field is desirable since this reduces the integrated field along the length of the reservoir and hence the maximum voltage required on the head.

In FIG. 23 ink storage is shown at 201 and an ejection point at 202 in a coordinate system x-y as shown. In the figure the particles removed through 202 have the parameters:

f0=frequency of particles removed
r0=radius of particles removed
k0=concentration of particles removed the rate of particle removal is equal to:

$$\frac{4}{3} \cdot \pi \cdot r0^3 \cdot k0 \cdot f0$$

We claim:

1. A method for depositing material on a surface from a chamber, the chamber having a transfer station at which the material can be discharged from an outlet, the surface on which the material is deposited being proximate to the opening, the method comprising the steps of:
   supplying a bulk medium to the chamber, the bulk medium comprising a dispersed, insoluble material in a support medium;
   subjecting the dispersed, insoluble material in the bulk medium to a force to effect a movement of the insoluble material within the bulk medium to displace the dispersed, insoluble material relative to the support medium and toward a transfer location within the transfer station to concentrate the insoluble material at the transfer location;
   discharging the insoluble material from the concentration at the transfer location through the outlet and depositing the discharged material onto the surface, and
   thereafter effecting continued movement of the insoluble material within the bulk medium toward the transfer location to maintain the concentration of insoluble material at the transfer location as the material is discharged from the outlet.

2. The method according to claim 1 wherein the step of discharging the material is further defined as discharging the material across a free interface formed between the bulk medium at the transfer location and another medium positioned between the transfer location and the surface.

3. The method according to claim 1 wherein the supplying step is further defined as supplying a bulk medium having dispersed, insoluble particulate material.

4. The method according to claim 3 wherein the insoluble, particulate material is electrically charged relative to the support medium and where the step of effecting movement of the dispersed, insoluble material is further defined as applying an electric field to the bulk medium to effect the movement by electrophoresis.

5. The method according to claim 3 wherein the insoluble, particulate material has a dielectric constant differing from that of the support medium and where the step of effecting movement of the dispersed, insoluble material is further defined as applying a non-uniform electric field to the bulk medium to move the dispersed, insoluble material by dielectrophoresis.

6. The method according to claim 3 wherein the insoluble, particulate material has a density differing from that of the support medium and wherein the step of effecting movement of the dispersed, insoluble material is further defined as carried out by sedimentation, flotation, or centrifugation.

7. The method according to claim 3 wherein the insoluble, particulate material has a net magnetic dipole moment and wherein the step of effecting movement of the dispersed, insoluble material is further defined as applying a non-uniform magnetic field to the bulk medium.

8. The method according to claim 3 wherein the supplying step is further defined as supplying a bulk medium comprising pigmented material particles in a support medium carrier and wherein the method is further defined as a method for printing the pigmented particles on the surface.

9. The method according to claim 3 wherein the surface comprises an electro-photographic member, wherein the particulate material is an electro-photographic toner and the method is further defined as one for discharging toner to the electro-photographic member.

10. The method according to claim 1 wherein the insoluble material is electrically charged relative to the support medium and where the step of effecting movement of the dispersed, insoluble material is further defined as applying an electric field to the bulk medium to effect the movement by electrophoresis.

11. The method according to claim 1 wherein the insoluble material has a dielectric constant differing from that of the support medium and where the step of effecting movement of the dispersed, insoluble material is further defined as applying a non-uniform electric field to the bulk medium to move the dispersed, insoluble material by dielectrophoresis.

12. The method according to claim 1 wherein the insoluble material has a density differing from that of the support medium and where the step of effecting movement of the dispersed, insoluble material is further defined as carried out by sedimentation, flotation, or centrifugation.

13. The method according to claim 1 wherein the insoluble material has a net magnetic dipole moment and wherein the step of effecting movement of the dispersed, insoluble material is further defined as applying a non-uniform magnetic field to the bulk medium.

14. The method according to claim 1 wherein the discharging step is further defined as discharging the material through a nozzle.

15. The method according to claim 1 wherein the discharging step is further defined as discharging the material at a transfer location comprising one of a metallic cone, needle shaped probe, bevel-ended tube, tapered hollow body, and metallic tapered solid body.

16. The method according to claim 1 wherein the discharging step is further defined as discharging a portion of the supporting medium along with the insoluble material.

17. The method according to claim 1 wherein the supplying step is further defined as supplying a fluid bulk medium to the chamber.

18. The method according to claim 17 wherein the supplying step is further defined as flowing a fluid bulk medium to the chamber to provide additional insoluble material to the chamber for replacing that discharged from the outlet and the deposited on the surface.

19. The method according to claim 18 wherein the supplying step is further defined as flowing a fluid bulk medium through the chamber in a manner that minimizes displacement of the bulk medium at the transfer location, thereby to maintain the concentration of insoluble material at the transfer location notwithstanding the flow of bulk medium in the chamber.

20. The method according to claim 1 wherein the supplying step is further defined as supplying a gel-like bulk medium to the chamber.

21. The method according to claim 1 wherein the discharge of the insoluble material comprises pulsatile ejection of the material from the transfer location.

* * * * *